US008534909B2

(12) United States Patent
Guidat et al.

(10) Patent No.: US 8,534,909 B2
(45) Date of Patent: Sep. 17, 2013

(54) MULTIPLE FLOW PATH MICROREACTOR DESIGN

(75) Inventors: Roland Guidat, Blennes (FR); Elena Daniela Lavric, Avon (FR); Olivier Lobet, Mennecy (FR); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 941 days.

(21) Appl. No.: 12/568,318

(22) Filed: Sep. 28, 2009

(65) Prior Publication Data

US 2010/0078086 A1 Apr. 1, 2010

(30) Foreign Application Priority Data

Sep. 29, 2008 (EP) .................................... 08305610
Oct. 22, 2008 (EP) .................................... 08305711

(51) Int. Cl.
*B01F 5/06* (2006.01)
*B01J 19/00* (2006.01)

(52) U.S. Cl.
USPC ............ 366/336; 366/341; 422/503; 422/603

(58) Field of Classification Search
USPC .................... 366/DIG. 3, 341; 422/198, 503, 422/603
See application file for complete search history.

(56) References Cited

U.S. PATENT DOCUMENTS 3,459,407 A * 8/1969 Hollis et al. .................. 366/338
3,476,521 A * 11/1969 Wise ............................ 366/336
3,924,989 A * 12/1975 Althausen et al. ............ 366/336
4,279,862 A * 7/1981 Bretaudiere et al. ............ 422/72
4,316,673 A * 2/1982 Speer ........................... 366/337
4,534,659 A * 8/1985 Dourdeville et al. ......... 366/338
5,300,779 A * 4/1994 Hillman et al. ............ 250/341.1
5,637,469 A * 6/1997 Wilding et al. .......... 366/DIG. 3
6,113,855 A * 9/2000 Buechler ....................... 422/412

(Continued)

FOREIGN PATENT DOCUMENTS

CN 1628907 6/2005
CN 101102835 1/2008

(Continued)

OTHER PUBLICATIONS

Yu, Liang; Nassar, Raja; Fang, Ji; Kuila, Debasish; and Varahramyan, Kody (2008) "Investigation of a Novel Microreactor for Enhancing Mixing and Conversion", Chemical Engineering Communications, 195: 7, 745-757, total 14 pages.*

(Continued)

*Primary Examiner* — Tony G Soohoo
(74) *Attorney, Agent, or Firm* — Gregory V. Bean

(57) ABSTRACT

A microfluidic device comprises at least one reactant passage defined by walls and comprising at least one parallel multiple flow path configuration comprising a group of elementary design patterns being able to provide mixing and/or residence time which are arranged in series with fluid communication so as to constitute flow paths, and in parallel so as to constitute a multiple flow path elementary design pattern, wherein the parallel multiple flow path configuration comprises at least two communicating zones between elementary design patterns of two adjacent parallel flow paths, said communicating zones being in the same plane as that defined by said elementary design patterns between which said communicating zone is placed and allowing passage of fluid in order to minimize mass flow rate difference between adjacent parallel flow paths which have the same flow direction.

10 Claims, 12 Drawing Sheets

(56) References Cited

U.S. PATENT DOCUMENTS

| | | | | |
|---|---|---|---|---|
| 6,170,981 | B1 * | 1/2001 | Regnier et al. | 366/336 |
| 6,296,020 | B1 * | 10/2001 | McNeely et al. | 137/806 |
| 6,457,854 | B1 * | 10/2002 | Koop et al. | 366/336 |
| 6,883,559 | B2 * | 4/2005 | Jeon et al. | 141/9 |
| 6,935,768 | B2 * | 8/2005 | Lowe et al. | 366/167.1 |
| 7,135,144 | B2 * | 11/2006 | Christel et al. | 422/527 |
| 7,794,136 | B2 * | 9/2010 | Yang et al. | 366/336 |
| 7,939,033 | B2 * | 5/2011 | Lavric et al. | 422/503 |
| 2005/0106756 | A1 * | 5/2005 | Blankenstein et al. | 436/523 |
| 2005/0232076 | A1 * | 10/2005 | Yang et al. | 366/336 |
| 2006/0171864 | A1 * | 8/2006 | Caze et al. | 422/130 |
| 2010/0078086 | A1 * | 4/2010 | Guidat et al. | 137/561 R |

FOREIGN PATENT DOCUMENTS

| | | | |
|---|---|---|---|
| CN | 101180540 | | 5/2008 |
| DE | 19746583 | A1 | 4/1999 |
| EP | 1531003 | A1 | 5/2005 |
| WO | WO 02/16017 | A2 | 2/2002 |
| WO | WO 2004/073863 | A2 | 9/2004 |

OTHER PUBLICATIONS

The State Intellectual Property Office of The People's Republic of China; Search Report; Date of Dispatch: Jan. 23, 2013; pp. 1-2.

* cited by examiner

MULTIPLE FLOW PATH MICROREACTOR DESIGN

PRIORITY

This application claims priority to European Patent Application Number 08305711.7, filed Oct. 22, 2008 and European Patent Application Number 08305610.1 filed Sep. 29, 2008, titled “Multiple Flow Path Microreactor Design”.

BACKGROUND OF THE INVENTION

Microfluidic devices, as understood herein, include fluidic devices over a scale ranging from microns to a few millimeters, that is, devices with fluid channels the smallest dimension of which is in the range of microns to a few millimeters, and preferably in the range of from about 10’s of microns to about 2 millimeters. Partly because of their characteristically low total process fluid volumes and characteristically high surface to volume ratios, microfluidic devices, particularly microreactors, can be useful to perform difficult, dangerous, or even otherwise impossible chemical reactions and processes in a safe, efficient, and environmentally-friendly way. Such improved chemical processing is often described as “process intensification.”

Process intensification is a paradigm in chemical engineering which has the potential to transform traditional chemical processing, leading to smaller, safer, and more energy-efficient and environmentally friendly processes. The principal goal of process intensification is to produce highly efficient reaction and processing systems using configurations that simultaneously significantly reduce reactor sizes and maximize mass- and heat-transfer efficiencies. Shortening the development time from laboratory to commercial production through the use of methods that permit the researcher to obtain better conversion and/or selectivity is also one of the priorities of process intensification studies. Process intensification may be particularly advantageous for the fine chemicals and pharmaceutical industries, where production amounts are often smaller than a few metric tons per year, and where lab results in an intensified process may be relatively easily scaled-out in a parallel fashion.

Process intensification consists of the development of novel apparatuses and techniques that, relative to those commonly used today are expected to bring very important improvements in manufacturing and processing, substantially decreasing equipment-size to production-capacity ratio, energy consumption and/or waste production, and ultimately resulting in cheaper, sustainable technologies. Or, to put this in a shorter form: any chemical engineering development that leads to a substantially smaller, cleaner, and more energy efficient technology is process intensification.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

The present inventors and/or their colleagues have previously developed various microfluidic devices useful in process intensification and methods for producing such devices. These previously developed devices include apparatuses of the general form shown in prior art FIG. 1. FIG. 1, not to scale, is a schematic perspective showing a general layered structure of certain type of microfluidic device. A microfluidic device 10 of the type shown generally comprises at least two volumes 12 and 14 within which is positioned or structured one or more thermal control passages not shown in detail in the figure. The volume 12 is limited in the vertical direction by horizontal walls 16 and 18, while the volume 14 is limited in the vertical direction by horizontal walls 20 and 22.

The terms “horizontal” and “vertical,” as used in this document are relative terms only and indicative of a general relative orientation only, and do not necessarily indicate perpendicularity, and are also used for convenience to refer to orientations used in the figures, which orientations are used as a matter of convention only and not intended as characteristic of the devices shown. The present invention and the embodiments thereof to be described herein may be used in any desired orientation, and horizontal and vertical walls need generally only be intersecting walls, and need not be perpendicular.

A reactant passage 26, partial detail of which is shown in prior art FIG. 2, is positioned within the volume 24 between the two central horizontal walls 18 and 20. FIG. 2 shows a cross-sectional plan view of the vertical wall structures 28, some of which define the reactant passage 26, at a given cross-sectional level within the volume 24. The reactant passage 26 in FIG. 2 is shaded for easy visibility of the fluid contained therein and forms a two-dimensionally tortuous and winding passage of constant width, in the form of a serpentine, which covers a maximum area of the surface of the plate defining the volume 24. The fluidic connections between the other parts of the microfluidic device 10 and the inlet 30 and outlet 32 of the tortuous reactant passage 26 shown in the cross section of FIG. 1 are provided in a different plane within the volume 12 and/or 14, vertically displaced from plane of the cross-section shown in FIG. 2.

The reactant passage 26 has a constant height in a direction perpendicular to the generally planar walls.

The device shown in FIGS. 1 and 2 serves to provide a volume in which reactions can be completed while in a relatively controlled thermal environment.

In FIG. 3, another prior art device is shown for the specific purpose to mix reactants, especially multiphase systems like immiscible fluids and gas liquid mixtures, and to maintain this dispersion or mixture over a wide range of flow rates. In this device of the prior art, the reactant passage 26 comprise a succession of chambers 34.

Each of such chamber 34 includes a split of the reactant passage into at least two sub-passages 36, and a joining 38 of the split passages 36, and a change of passage direction, in at least one of the sub-passages 36, of at least 90 degrees relative to the immediate upstream passage direction. In the embodiment shown, it may be seen in FIG. 3 that both sub-passages 36 change direction in excess of 90 degrees relative to the immediate upstream passage direction of the reactant passage 26.

Also in the embodiment of FIG. 3, each of the multiple successive chambers 34, for those having an immediately succeeding one of said chambers, further comprises a gradually narrowing exit 40 which forms a corresponding narrowed entrance 42 of the succeeding chamber. The chambers 34 also include a splitting and re-directing wall 44 oriented crossways to the immediately upstream flow direction and positioned immediately downstream of the chamber's entrance 42. The upstream side of the splitting and re-directing wall 44 has a concave surface 46. The narrowing exit 40 from one chamber 34 to the next is desirably on the order of about 1 mm width. The channel desirably may have a height of about 800 μm.

Although good performance has been obtained with devices of this type, in many cases even exceeding the state of the art for a given reaction, it has nonetheless become desirous to improve fluid dynamic performance. In particular, it is desirable to obtain a controlled and well-balanced residence time while simultaneously decreasing the pressure drop caused by the device, while increasing throughput.

In U.S. Pat. No. 7,241,423 (corresponding to US2002106311), "Enhancing fluid flow in a stacked plate microreactor," parallel channels (see FIG. 37) are used in order to implement an internally parallelized chemical reaction plant for the purpose of provide a microscale reaction apparatus that can provide substantially equal residence time distribution for fluid flow. However this reference does not solve all the issues related to controlled and even distribution of fluid flow.

SUMMARY OF THE INVENTION

A microfluidic device comprises at least one reactant passage (26) defined by walls and comprising at least one parallel multiple flow path configuration, said parallel multiple flow path configuration comprising a group of elementary design patterns of the flow path which are arranged in series with fluid communication so as to constitute flow paths, and in parallel so as to constitute a multiple flow path elementary design pattern in the parallel flow paths, said elementary design pattern being able to provide mixing and/or residence time, wherein the parallel multiple flow path configuration comprises at least two communicating zones between elementary design patterns of two adjacent parallel flow paths, said communicating zones being in the same plane as that defined by said elementary design patterns between which said communicating zone is placed and allowing passage of fluid (flow interconnections) in order to minimize mass flow rate difference between adjacent parallel flow paths which have the same flow direction.

In some cases, an equalization of the mass flow rate (and also of the fluid pressure) between the adjacent parallel flow paths of the parallel multiple flow path configuration can be achieved.

Moreover, this solution allows, thanks to the communicating zones, a uniformity of Residence Time in several parallel micro channels or flow paths of each parallel multiple flow path configuration.

Therefore, provided each flow path is of equal length, width and height to get a constant residence time and hydraulic properties, the parallel multiple flow path configuration according to the invention bring an increased of microreactor chemical production throughput.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
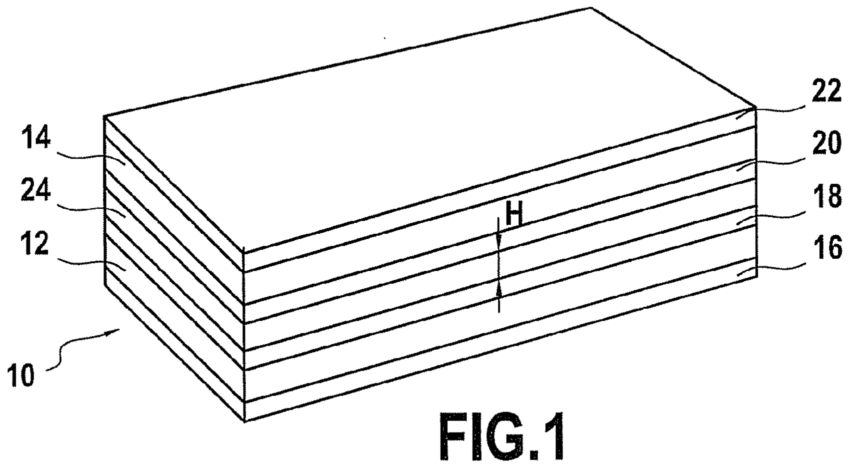
FIG.1 PRIOR ART
FIG. 1 (prior art) is a schematic perspective showing a general layered structure of certain prior art microfluidic devices.
Figure 2:
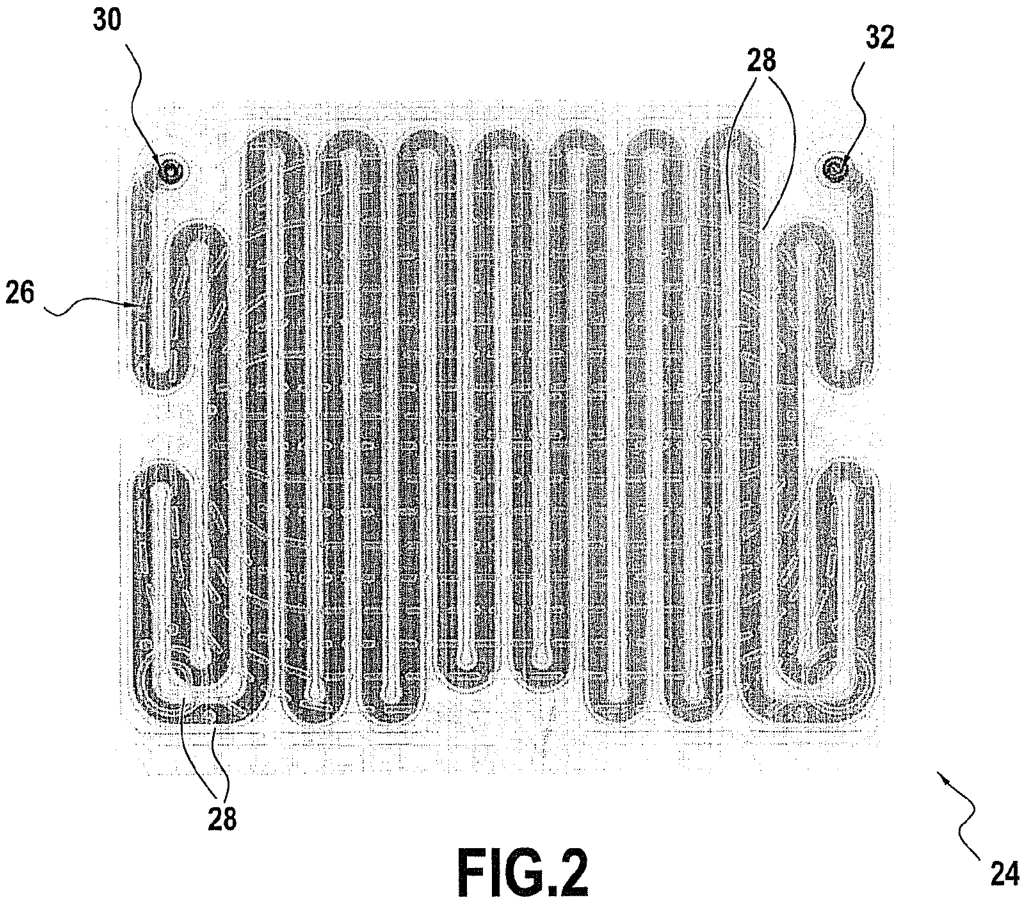
FIG.2 PRIOR ART
FIG. 2 (prior art) is a cross-sectional plan view of vertical wall structures within the volume 24 of FIG. 1.

Reference will now be made in detail to the presently preferred embodiments of the invention, examples of which are illustrated in the accompanying drawings. Whenever possible, the same reference numerals will be used throughout the drawings to refer to the same or like parts.

Without limitation, in the microfluidic devices of the invention the reactant passage and its portion constituted by parallel multiple flow path configurations are generally extending in an horizontal plane and defined by vertical walls. The "width" refers to a direction which is perpendicular to the flow direction and parallel to said horizontal plane of the parallel multiple flow path configuration. The "height" refers to a direction which is perpendicular to the flow direction and perpendicular to said horizontal plane of the parallel multiple flow path configuration. The "length" refers to a direction which is parallel to the flow direction and parallel to said horizontal plane of the parallel multiple flow path configuration.

Figure 3:
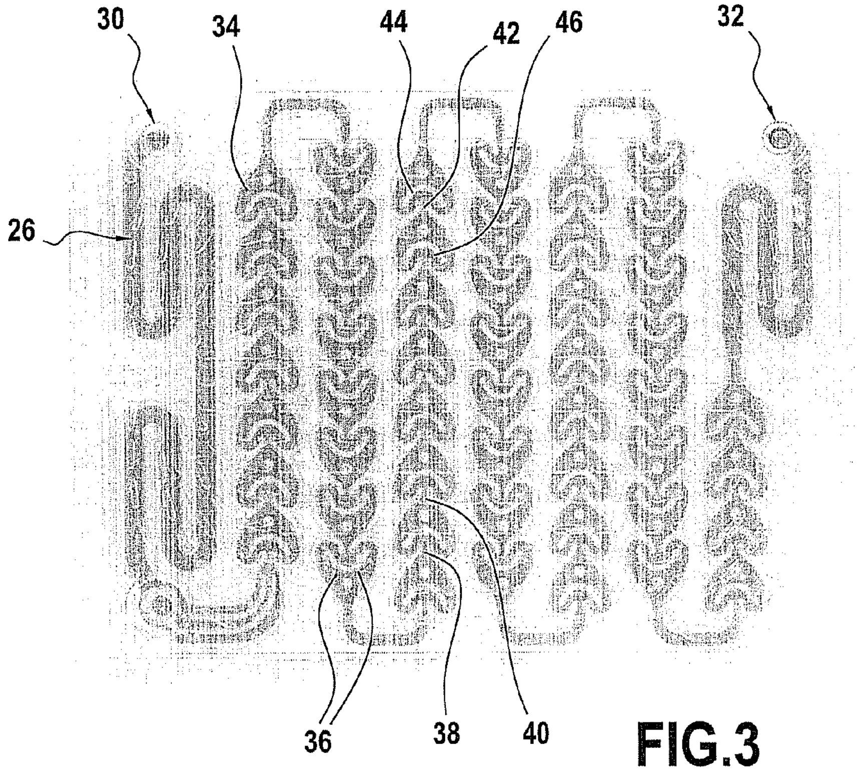
FIG.3 PRIOR ART
FIG. 3 (prior art) is a cross-sectional plan view of vertical wall structures within the volume 24 of FIG. 1 according to another prior art microfluidic device.
Figure 4:
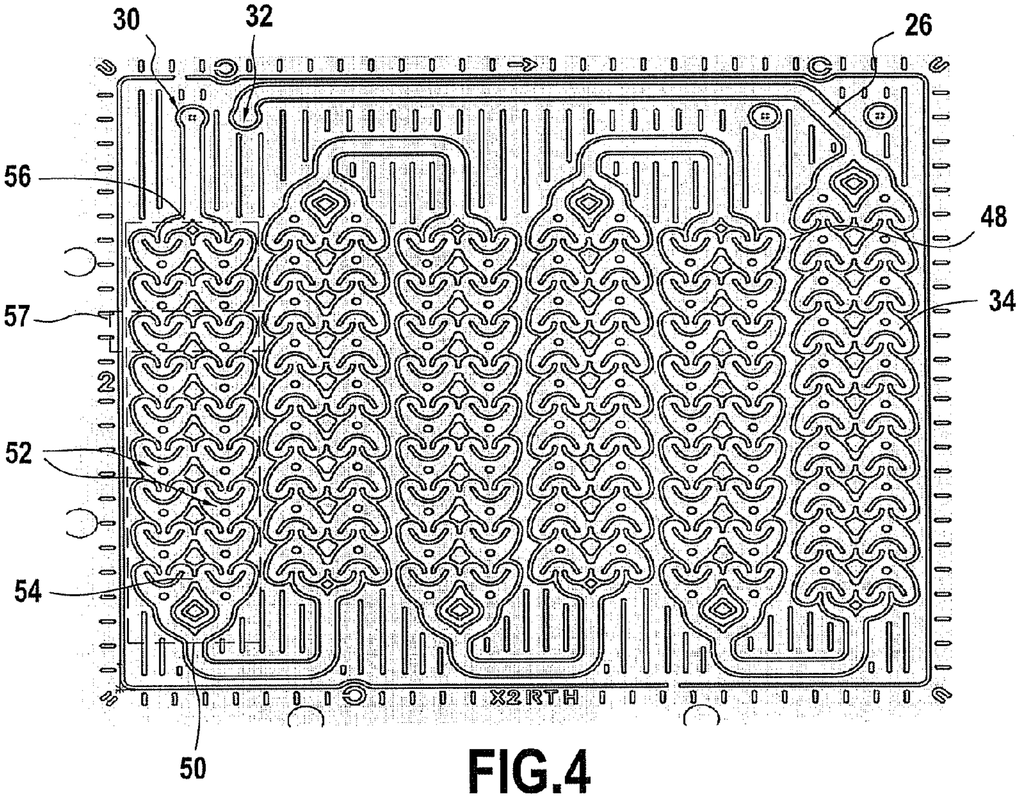
FIG. 4 is a cross-sectional plan view of vertical wall structures with elementary design patterns of a first type defining parallel multiple flow path configurations according to a first embodiment of the present invention.

In FIG. 4 is visible a microfluidic device having a reactant passage 26 according to a first embodiment with six parallel multiple flow path configurations 50 placed in series. Each parallel multiple flow path configuration 50 has two parallel path flows 52 formed by the succession of nine chambers 34 placed in series in adjacent manner. Each chamber 34 forms an elementary design pattern of a first type, which is similar to that of FIG. 3, able to provide good mixing quality and to maintain liquid immiscible or gas liquid dispersion.

The two parallel path flows 52 are adjacent to each other. Also the adjacent chambers 34 of the two parallel path flows 52 form pairs of chambers 34 (more generally a multiple flow path elementary design pattern 57 with a communicating zone 54 between them. This communicating zone 54 is formed by a direct fluid connection between the pairs of chambers 34 so that when the flow of fluid passes in parallel in the two parallel path flows 52, there is a possible passage of fluid between the two parallel path flows 52 at the location of these communicating zone 54. Therefore, there is a contact point (common portion of wall) with an aperture/opening (communicating zone 54) between the adjacent chambers 34 of the parallel path flows 52.

This specific possible passage of fluid or flow interconnection between the parallel path flows allows correction of any potential flow misbalance which can be due, among others, to the design of the reactant passage 26 (especially the manifold design) and/or the tolerance of the manufacture process and/or plugging of a flow path.

The fluid flow rate can therefore be balanced between all the flow paths 52 of the parallel multiple flow path configuration 50.

Moreover, having the communicating zones 54 in the same volume 24 as that of the reactant passage 26 or the chamber 34, i.e. having the communicating zones 54 in the same plane as that of the parallel flow paths 52, brings some meaningful advantages: such a configuration is simple to manufacture (same plate), optimizes the thermal transfer with the thermal control passages of the volumes 12 and 14 placed on both sides of the volume 24 and avoid additional pressure drop and dead zones that are detrimental for an even Residence Time distribution and safety.

According to the invention, the design of manifold 56 placed upstream of each parallel multiple flow path configuration 50 and the strict similarity of the chambers 34 and of the parallel fluid flows 52 are therefore less critical.

The two channels or flow paths 52 are adjusted in such a way that they are regularly in contact at their edges with an opening (communicating zone 54) between them being adjusted to allow a modification of flow repartition in case of different pressure drop between parallel fluid flows 52 (manufacturing tolerances or plugging for example), and small enough not to modify significantly the flow pattern at the said contact points.

The successive chambers 34 make up a significant portion of the reactant passage 26 of the embodiment of a microfluidic device represented in FIG. 4. The chambers 34 desirably have a constant height H, shown in FIG. 1, in a direction generally perpendicular to the walls 18 and 20, which height H generally corresponds to the distance between the walls 18 and 20. In other words, the portion of passage 26 having the chambers 34 generally occupies the maximum space possible in the direction of height H, matching the maximum dimension of the volume 24 in the direction of H. This is significant because (1) the volume of a given lateral size microfluidic device is thus maximized, allowing longer residence times at higher throughput rates and (2) the amount of material and distance between reactant passage 26 and the volumes 12 and 14 in which one or more thermal control fluid passages are contained is minimized, allowing for greater heat transfer. Further, although the height H may desirably be on the order of 800 μm to in excess of a few millimeters, the thickness of boundary layers in the direction of H are generally reduced by secondary flows induced within the reactant passage by passing of the reactant fluid through the directional changes caused by the splitting and re-directing walls 44, and by repeated passage though gradually narrowing exits 40 into the wider space of the successive chambers 34.

For devices in which heat exchange and residence time is to be maximized, it is desirable that the multiple successive chambers 34 extend along at least 30%, preferably at least 50% of the total volume of the reactant passage 26, more desirably at least 75% or more, as is the case in the embodiment of FIG. 4.

As may also be seen in the embodiment of the present invention in FIG. 4, the successive chambers 34 desirably share common walls with the next chambers in the up- and down-stream directions. This helps assure that the maximum number of chambers 34 is positioned within a given space, and thus also maximizes the volume of the reactant passage

26 as a fraction of total volume available between the walls 18, 20. In particular, it is desirable that the reactant passage 26 has an open volume of at least 30% of the total volume consisting of (1) said open volume (2) the volume of the wall structures 28 that define and shape the reactant passage between the horizontal walls 18, 20, and (3) any other volume such as empty volume 48 between the wall structures 28 that define and shape the reactant passage 26. More desirably, the reactant passage has open volume of at least 40%.

Figure 5:
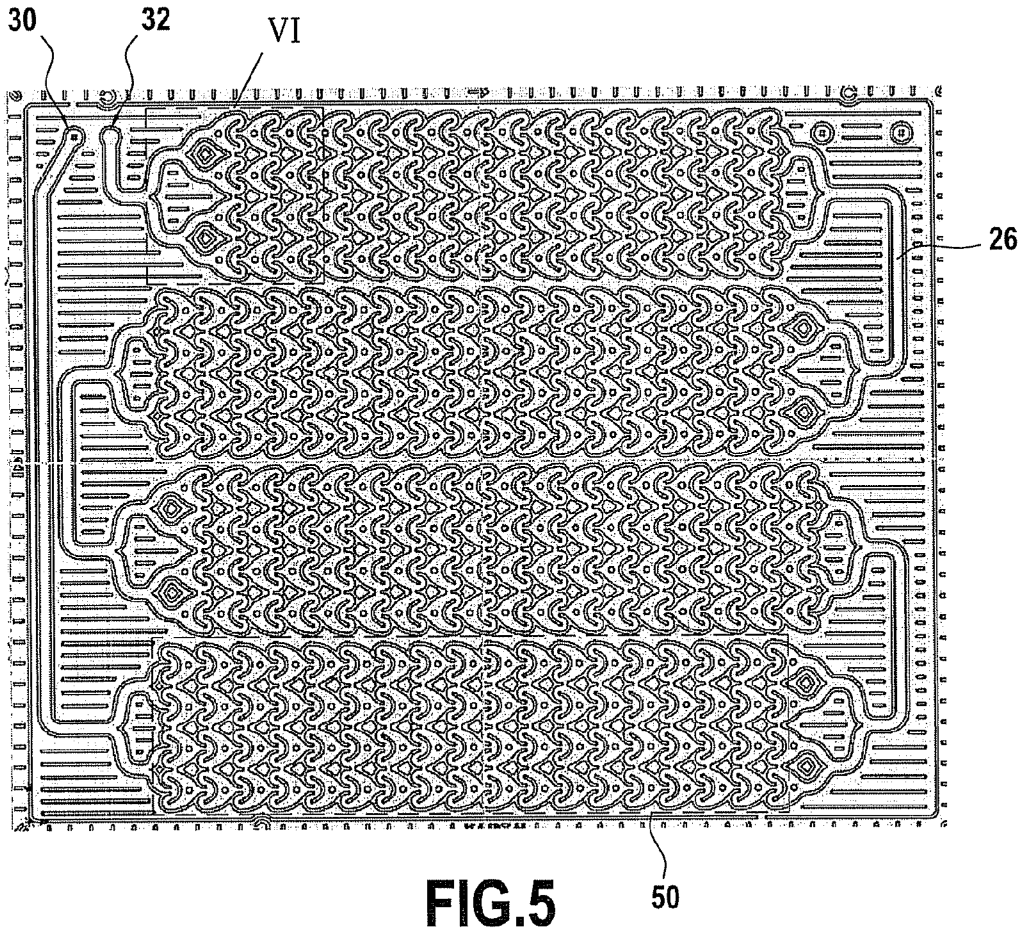
FIG. 5 is a cross-sectional plan view of vertical wall structures defining parallel multiple flow path configurations according to a variant of the first embodiment of the present invention.

In the variant of FIG. 5 the reactant passage 26 has four parallel multiple flow path configurations 50 placed in series between the inlet 30 and the outlet 32. Each parallel multiple flow path configuration 50 has four parallel and adjacent path flows 52 each formed by the succession of eighteen chambers 34 placed in series in adjacent manner.

In this configuration, the four adjacent chambers 34 in fluid communication with each other, each of which is part of a different path flows 52, form together a multiple flow path elementary design pattern 57 in which the fluid flows at a same level in the four parallel path flows 52.

Figure 6:
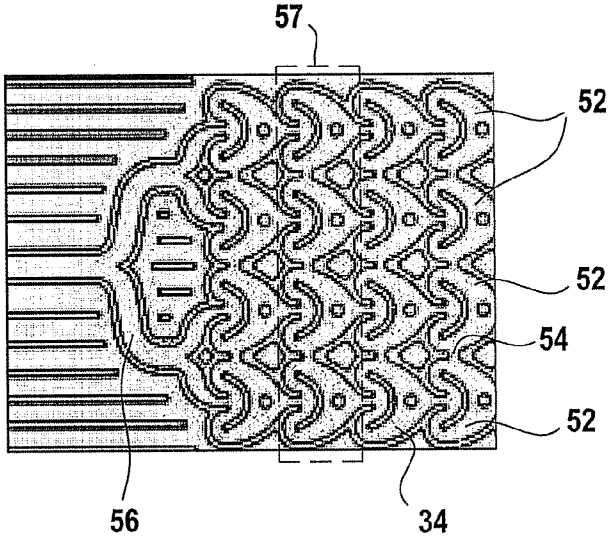
FIG. 6 is an enlarged view of detail VI of FIG. 5.

As may be seen in the enlarged partial view of FIG. 6, communicating zones 54 are formed between all the pairs of two adjacent elementary design patterns or chambers 34 of all of said multiple flow path elementary design patterns 57 of the four parallel multiple flow path configurations 50.

Figure 20:
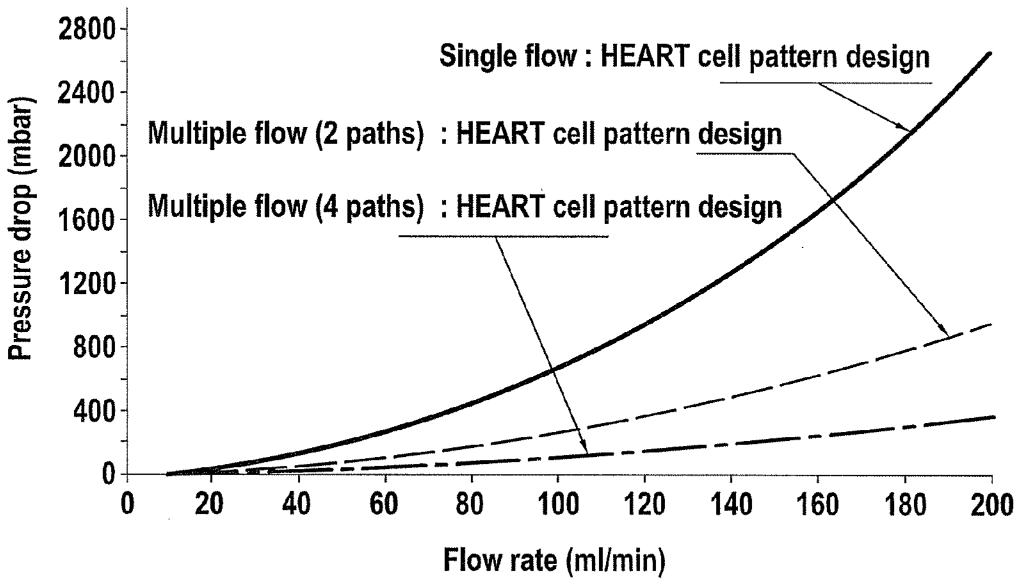
FIG. 20 is a graph of pressure drop across a microfluidic device in millibar, as a function of flow rate in milliliters per minute, comparing two embodiments of the invention to a prior art device.

The key advantage of multiple flow paths approach according to this invention is to reduce significantly pressure drop for a given flow rate. As an example, for an elementary design pattern formed by chambers 34 as shown on FIGS. 4 to 6, dual flow (two channels in parallel as shown on FIG. 4) allows dividing pressure drop by a factor 2.7 at 200 ml/min as compared to a pattern with only one channel (FIG. 3). Then the use of four parallel flows as shown on FIGS. 5 and 6 still provides a further pressure drop reduction by a factor 2.5 as compared to a pattern with two channels, leading to a reduction by a factor 6.8 as compared to a single channel (see FIG. 20).

Figure 21:
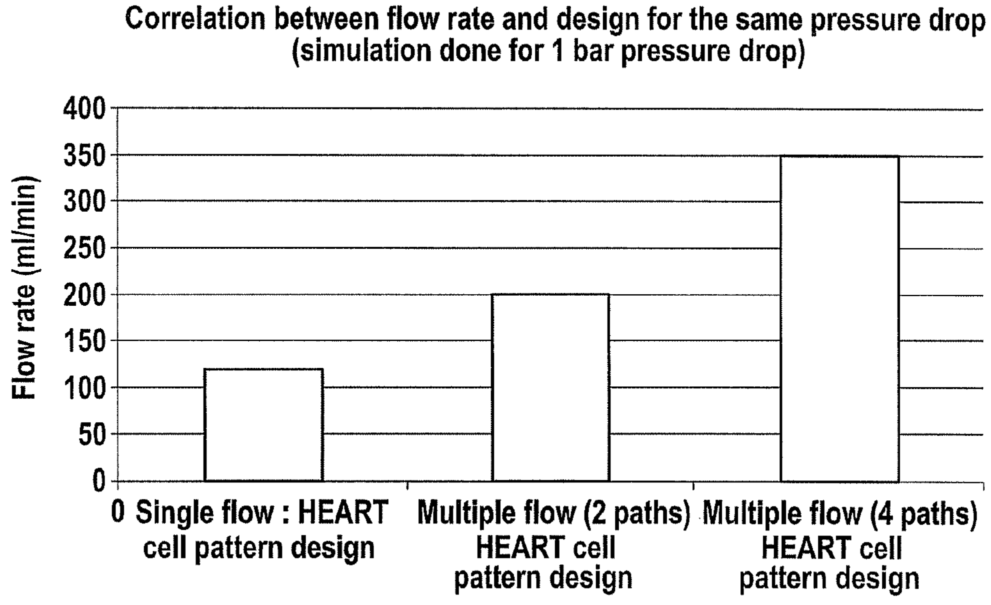
FIG. 21 is a graph showing the correlation between flow rate and design for the same pressure drop comparing two embodiments of the invention to a prior art device (simulation done for 1 bar pressure drop).

Another way to highlight a key benefit of this multiple flow path approach is to look at maximum working flow rate corresponding to the same pressure drop. The data of FIG. 21 shows that the maximum possible flow rate corresponding to 1 bar pressure drop is respectively 120 ml/min for a pattern with only one channel (FIG. 3), 200 ml/min for a pattern with two channels in parallel as shown on FIG. 4 and 350 ml/min for a pattern with four channels in parallel as shown on FIGS. 5 and 6.

Therefore, multiple flow paths architecture according to this invention allowing a significant pressure drop reduction, it is an efficient way to increase chemical production throughput without increasing energy consumption to pump the fluids, and to keep pressure drop below typical design pressure of equipments and/or the complexity of the system through external numbering up.

Moreover, another key advantage of this high throughput design approach is to significantly reduce pressure drop (at a given flowrate) without any negative impact on pressure resistance and mixing/dispersions quality. So no compromise is needed, especially regarding:

Pressure resistance: a parallel multiple flow path configuration 50 is formed by implementing in parallel channels formed by a series of elementary design patterns (for instance chamber 34 with a heart shape of FIGS. 3 to 5). Putting in parallel elementary design patterns able to withstand a given pressure rupture doesn't reduce total pressure rupture, so pressure resistance is conserved.

Figure 22:
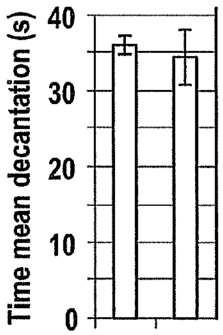
FIG. 22 is a graph showing mean time decantation in seconds, comparing an embodiment of the invention to a prior art device (at T=35° C., a total quantity of 120 g/min, using a Solvent flowrate of 110 g/min, and a diol flowrate of 10 g/min)

Dispersions (or mixing) quality: as the base elementary design pattern is conserved, the efficiency of mixing is comparable to the prior art single channel designs. In case of emulsions, the quality of emulsion has been assessed using solvent & diol non-miscible liquid system. The emulsion is created in the microstructures and the fluid flowing out of the microstructure collected. Time needed for decantation was taken as a measure of the quality of the emulsion formed inside the microstructure (the higher the time, the better the quality). As reported in FIG. 22, the design with two channels in parallel according to the invention as shown on FIG. 4 gives a result (at the left side of FIG. 22) as good as a pattern with a single flow path according to the prior art as shown on FIG. 3 (at the right side of FIG. 22). In this test, the design with a single flow path has a lower internal channel height (1 mm) than the design with dual flow path (1.1 mm). And the lower the channel height is, the better suspension quality is.

Figure 7:
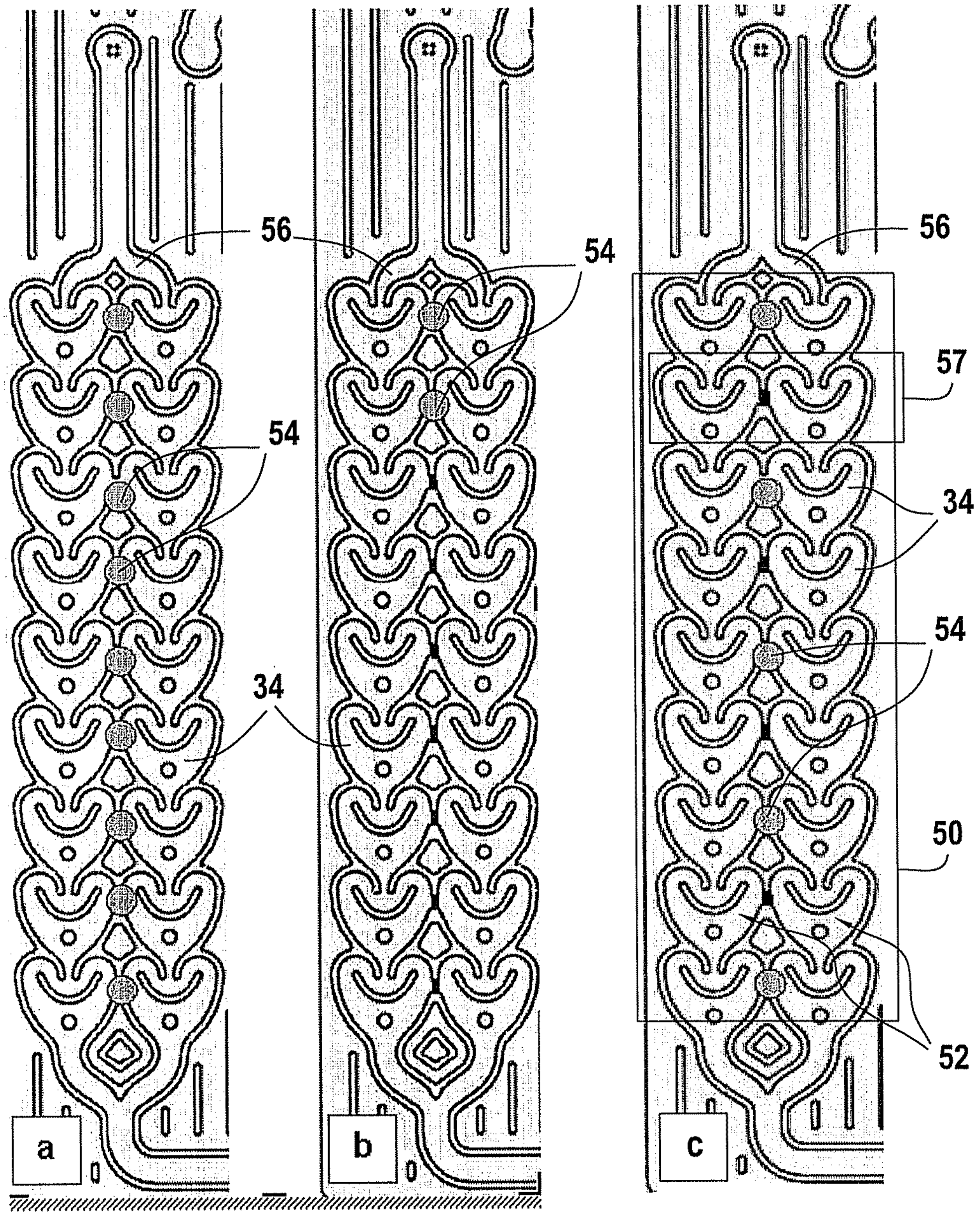
FIG. 7 to FIG. 9 are partial cross-sectional plan view of vertical wall structures with elementary design patterns of the first type according to some alternative of the location of the communicating zones in the parallel multiple flow path configuration.

As shown on FIG. 7 for a parallel multiple flow path configuration 50 with two flow paths 52, the communicating zones 54 between parallel adjacent chambers 54 can have different distribution or physical arrangement:

FIG. 7*a* is a configuration in which said communicating zones 54 are formed between all the pairs of two adjacent elementary design patterns (chambers 34) of all of said multiple flow path elementary design patterns 57 of said parallel multiple flow path configuration 50, FIG. 7*b* shows an alternative in which said communicating zones 54 are formed only between the pairs of two adjacent elementary design patterns (chambers 34) of the first two multiple flow path elementary design patterns 57 located in the upstream part of said parallel multiple flow path configuration 50, and FIG. 7*c* shows another alternative in which said communicating zones 54 are formed only between every other pair of two adjacent elementary design patterns (chambers 34) of all of said multiple flow path elementary design patterns 57 of said parallel multiple flow path configuration 50.

Figure 8:
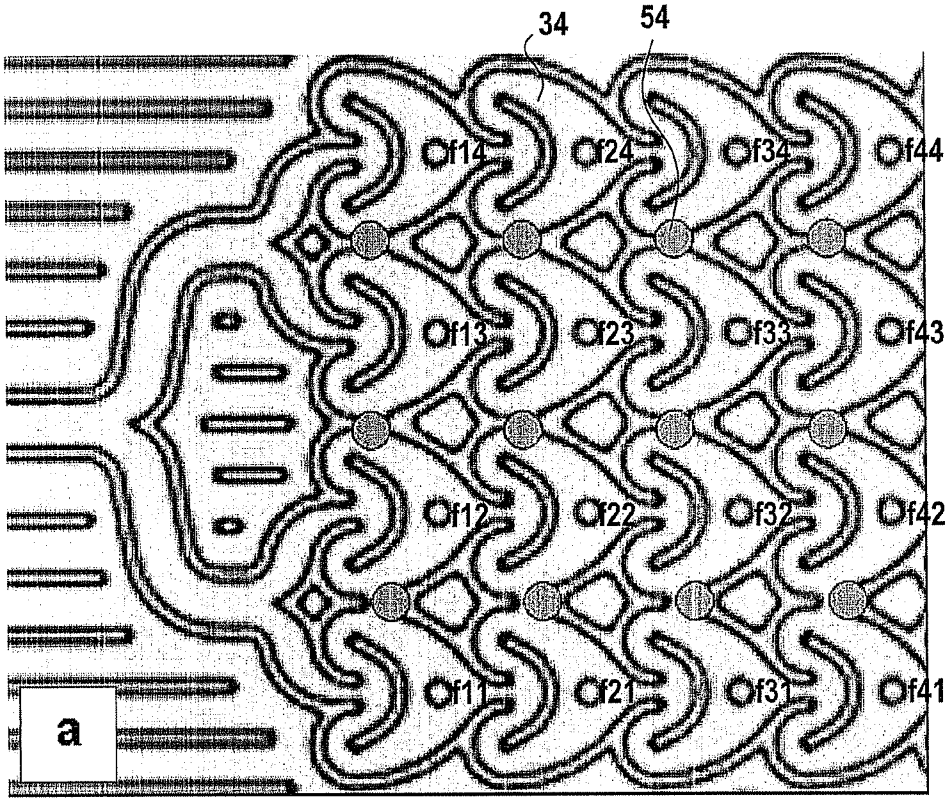
Figure 9:
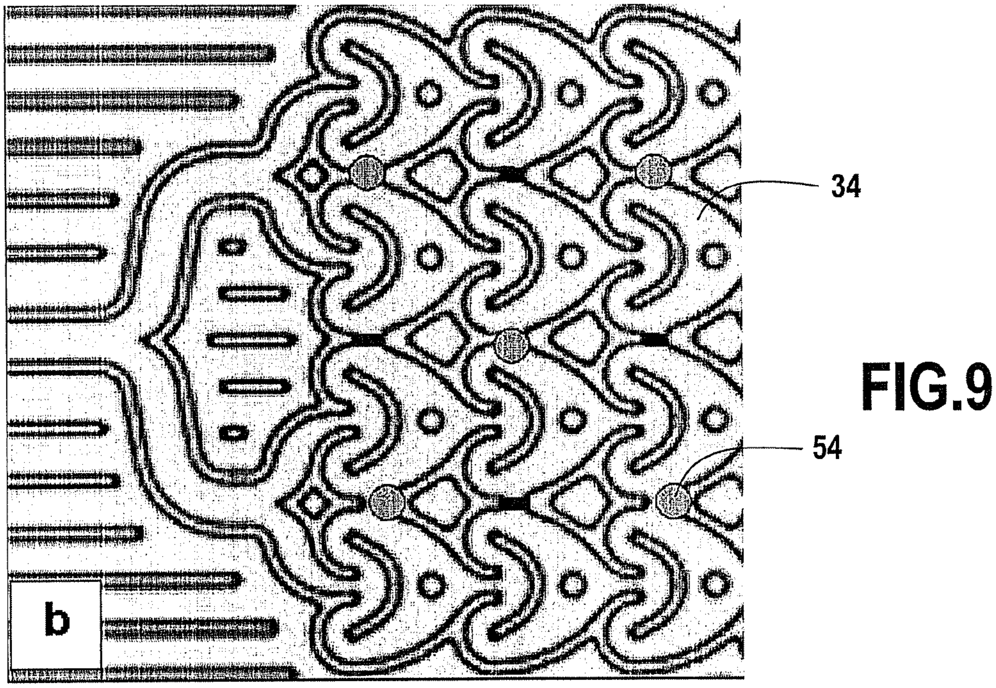

FIGS. 8 and 9 partially show a parallel multiple flow path configuration 50 with four parallel fluid paths 52:

on FIG. 8 the communicating zones 54 are formed between all the pairs of two adjacent elementary design patterns (chambers 34) of all of said multiple flow path elementary design patterns 57 of said parallel multiple flow path configuration 50, and FIG. 9 shows another alternative in which said communicating zones 54 are formed only between some pairs of two adjacent elementary design patterns (chambers 34): more precisely the communicating zones 54 forming flow interconnections are located in a staggered configuration.

Figure 23:
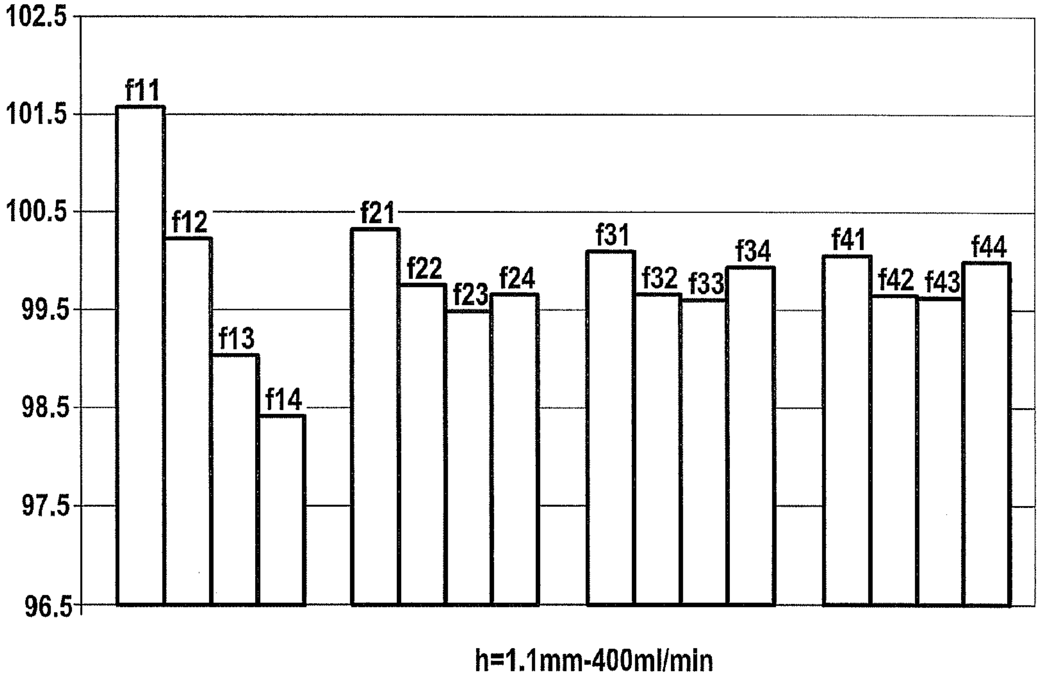
FIG. 23 shows the mass flow rate in milliliters per minute through cross-sections for the configuration of vertical wall structures of FIG. 8.

Referring to FIG. 23, is shown a simulation of the mass flow rate in milliliters per minute through cross-sections of the flow paths of a parallel multiple flow path configuration 50 with four parallel flow paths (FIG. 8) having communicating zones 54 between all the pairs of two adjacent elementary design patterns (chambers 34). More precisely the mass flow rate is expressed at the outlet portion of each chamber 34 of the first four levels of the parallel multiple flow path configuration 50, these locations having a reference number fxy, where x is the position of the level along the flow paths 52 and y the lateral position. The simulation shown on FIG. 23 is putting into evidence efficiency of flow interconnection for four parallel flow paths: flow misbalance existing at the entrance (cross-sections f11, f12, f13 and f14 of the first level) almost completely disappears after four flow interconnections (cross-sections f41, f42, f43 and f44 of the fourth level have very close flow rates).

FIGS. 10A-10G are cross-sectional plan views of multiple alternative wall structures defining portions of reaction passages according to some alternative embodiments of the present invention, in particular, defining alternative forms of the successive chambers 34. The chambers shown in the embodiments above generally correspond to those of FIG. 10F, wherein a post 58 may potentially serve to increase the pressure resistance of the chamber 34 relative to a chamber 34 having a larger open area or "free span" as in the embodiment of FIG. 10A. On the other hand, embodiments without the post 58 may have less tendency toward having a small dead volume (a slow moving spot in the fluid flow pattern) upstream of the post 58. The embodiment of FIG. 10G essentially avoids all risk of dead volume by including a triangular backing structure 60 on the downstream side of the splitting and re-directing wall 44, being therefore particularly recommended for handling solids such as solid suspensions or precipitating reactions, which can tend to collect in areas of dead volume to clog a reactant passage.

Figure 10:
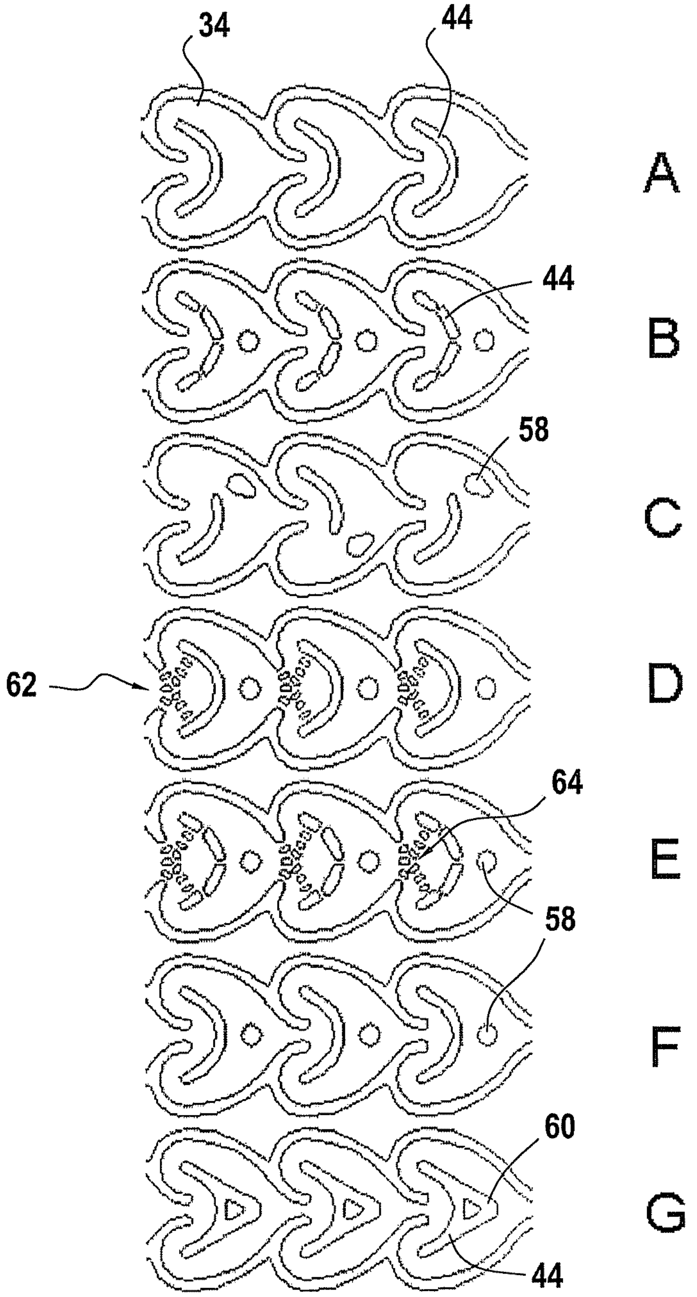
FIGS. 10A-10G are partial cross-sectional plan views of multiple vertical wall structures defining alternative elementary design patterns of the first type.

In the embodiment of FIG. 10B, the splitting and re-directing wall 44 is segmented in four segments, thus dividing the reactant passage into two main sub-passages around the splitting and re-directing wall 44 and three secondary sub-passages between the segments of the wall 44. The small size of the secondary sub-passages can help to maintain fine emulsions.

In the embodiment of FIG. 10C, the splitting and re-directing wall 44 is asymmetrical, being offset to alternating sides in successive chambers 34 so as to provide especially strong secondary flows. The post 58 is also offset from the center of the chamber 34 in alternating fashion, and by being positioned in the larger of the two sub-passages formed by the wall 44, the post 58 serves as an additional flow divider.

The embodiments of FIGS. 10D and 10E correspond to those of 10F and 10B, respectively, with the following difference: the gradually narrowing exit 40 of the previously discussed embodiments is replaced by a wider exit 62 filled with small secondary flow dividers 64 positioned to as to finely divide the incoming flow to the chamber 34, thereby assisting to create and maintain an emulsion or other immiscible mixture.

Figure 11:
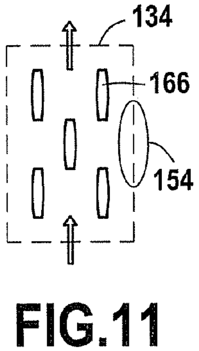
FIG. 11 is a cross-sectional plan view of an elementary design pattern of a second type.
Figure 12:
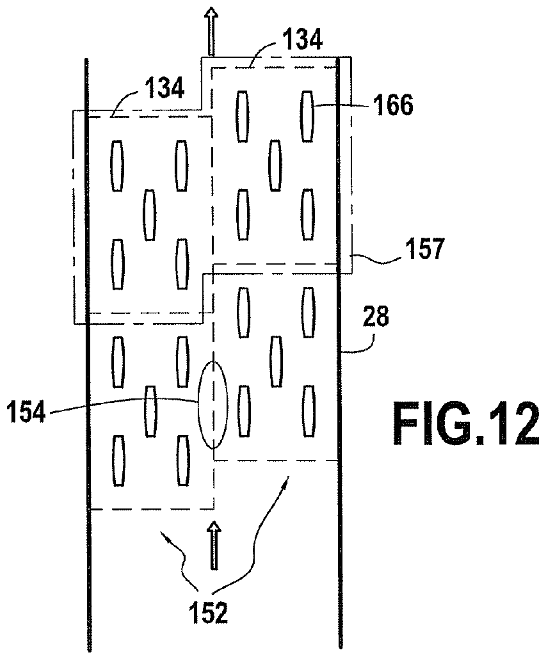
FIG. 12 is a cross-sectional plan view of alternative vertical wall structures using the elementary design patterns of the second type of FIG. 11 for defining portions of a parallel multiple flow path configuration according to yet another alternative embodiment of the present invention.
Figure 13:
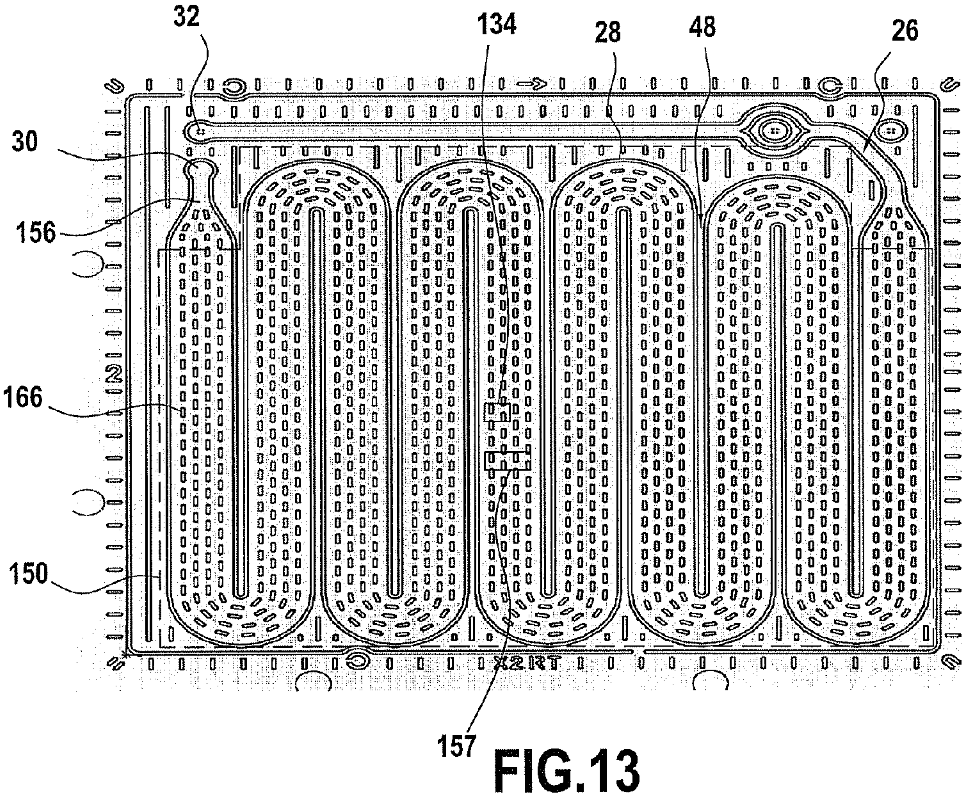
FIG. 13 is a cross-sectional plan view of vertical wall structures with elementary design patterns of the second type defining a parallel multiple flow path configuration according to a second embodiment of the present invention.

Referring to FIGS. 11 to 13, an elementary design pattern of a second type is proposed in the form of an open cell/space 134 with several pillars 166 placed in staggered configuration (five pillars 166 on FIGS. 11 and 12). The pillars 166 have the height of the reactant passage 26 and are elongated and parallel to the fluid flow direction (arrows on FIGS. 11 and 12).

The pillars 166 are structures serving as turbulence promoter or static mixer along the fluid flow path 152. In this context, the pillars could present other designs, including designs which have portions which are not parallel to the fluid flow direction in order to promote turbulence.

The open cells 134 are placed in series to form a flow path 152 and in parallel to form a multiple flow path elementary design pattern 157 which is limited by lateral vertical wall structures 28.

The two (or more) open cells 134 placed in parallel to form a multiple flow path elementary design pattern 157 can be aligned in the lateral direction (FIG. 13) or shifted in upstream or downstream direction with respect to the fluid flow direction (FIG. 12).

The flow path elementary design patterns 134 are placed in series to form a parallel multiple flow path configuration 150 which is a continuous straight channel or a tortuous channel with important straight portions (FIG. 13).

The pillars 166 are arranged such that in all transverse sections (all widths) of the parallel multiple flow path configuration 150, there is at least one pillar 166 (FIGS. 12 and 13).

The communicating zones 154 between two adjacent elementary design patterns or open cells 134 are openings or passages defined between at least two pillars 166 of each of these two adjacent elementary design patterns or open cells 134, notably two pillars 166 in alignment.

In the alternative staggered configuration of the pillars of FIG. 13, which shows a second embodiment of the present invention, each cross-section of the open cell 134, which is perpendicular to the fluid flow direction, contains at least one portion of pillar(s). The parallel multiple flow path configuration 150 of FIG. 13 forms an enlarged multiple fluid flow path disposed downstream a manifold 156 having a very simple configuration.

With these elementary design pattern of the second type in the form of an open cell 134 with pillars 166, sub passages of the flow path 152 are defined by the pillars 166, between the pillars 166 which are offset in the lateral direction, i.e. which are not in alignment along the flow path 152.

The elementary design pattern of the second type 134 is particularly dedicated for homogenous fluid residence time.

In FIGS. 12 and 13, there are two flow paths 152 in parallel, each multiple flow path elementary design pattern 157 having two design patterns of the second type or open cells 134 placed in parallel, but more than two open cells 134 could be placed in parallel between the lateral vertical wall structures 28.

Figure 14:
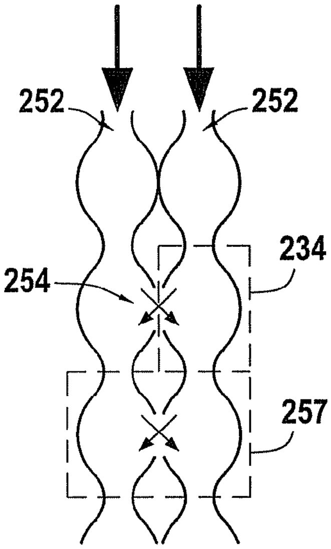
FIGS. 14 and 15 are cross-sectional plan views of two alternative vertical wall structures with elementary design patterns of a third type.
Figure 15:
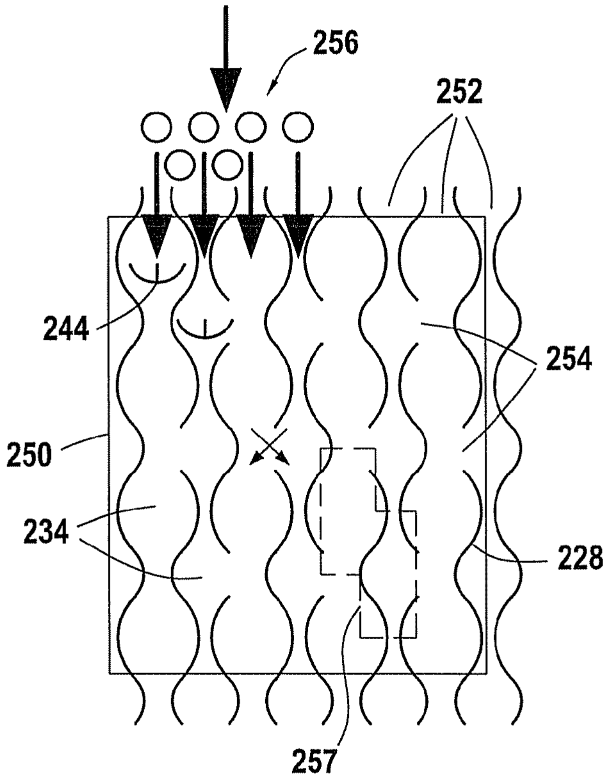

FIGS. 14 and 15 show another possible form for the elementary design pattern: this is an elementary design pattern of the third type or wavy chamber 234. This wavy chamber 234 defines a flow path portion and has a width which is progressively enlarged and then progressively reduced in the flow direction, before the reduced width forming the entrance of the following downstream wavy chamber 234 having the same design.

The variation of width allow for a better pressure resistance of the wall structures. Moreover, such a configuration allow a contact between two parallel elementary design patterns at the location of their larger width, which is a simple way to create a communicating zone only by creating an opening in this location of contact with a common wall.

The wavy chambers 234 are placed in series to form a flow path 252 and in parallel to form a multiple flow path elementary design pattern 257. The flow path elementary design patterns 257 are placed in series to form a parallel multiple flow path configuration 250.

In FIG. 14, the communicating zones 254 between two adjacent elementary design patterns or wavy chambers 234 are fowled by an opening between two adjacent wavy chambers 234 which are in contact along by their enlarged width.

In the alternative form of FIG. 15, the wavy chambers 234 are staggered in the flow direction between two adjacent parallel flow paths 252 so that a single wavy wall 228 serves to delimit two adjacent parallel flow paths 252. In other words, two adjacent parallel flow paths 252 are bordered by the two opposite face of the same single wavy wall 228 which optimises the space occupied by the reactant passage in the volume 24.

In that case, the communicating zones 254 between two adjacent elementary design patterns or wavy chambers 234 are formed by an opening in the single wavy wall 228.

As shown on FIG. 15, the elementary design pattern of the third type or wavy chamber 234 can contain a splitting and re-directing wall 244.

The two (or more) wavy chambers 234 placed in parallel to form a multiple flow path elementary design pattern 257 can be aligned in the lateral direction (FIG. 14) or shifted in upstream or downstream direction with respect to the fluid flow direction (FIG. 15).

FIG. 14 shows the implementation of two parallel flow paths 252 and FIG. 15 shows the implementation of eight parallel flow paths 252 but any other number of parallel flow paths can be implemented in each parallel multiple flow path configuration 250.

As previously indicated, elementary design pattern of the first type or chamber 34, elementary design pattern of the second type or open cell 134 and elementary design pattern of the third type or wavy chamber cell 234 provide mixing and/or residence time, have a width which is not constant along the direction of the flow path and can be in flow interconnection with another elementary design pattern of the same type of the adjacent flow path.

Other elementary design patterns able to provide mixing and/or residence time can be used according to the parallel multiple flow path configuration described above, i.e notably with elementary design patterns which are adjacent to each other both in series and in parallel.

Preferably, the communicating zones are formed by a direct flow interconnection between two adjacent elementary design patterns of said multiple flow path elementary design pattern.

For each parallel multiple flow path configuration a manifold 56, 156, 256 is placed along said reactant passage upstream said parallel multiple flow path configuration in order to divide or fork said reactant passage 26 into so many flow paths as there are in the parallel multiple flow path configuration.

Figure 16:
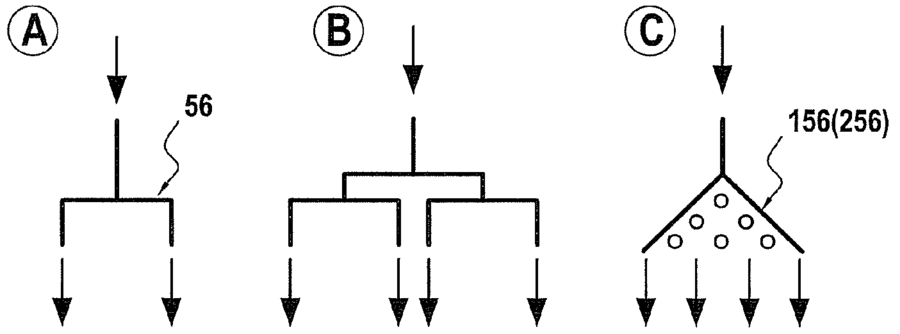
FIG. 16 are schematic representations of possible manifold structures to be placed upstream of each of the parallel multiple flow path configuration.

Due to flow interconnection between adjacent parallel flow paths, which allow for correction of flow misbalance between the parallel flow paths, the manifolds design can be simple and need to take into account fluids physical properties with limited accuracy. FIG. 16 show three possible simple designs for manifolds 56, 156, 256.

These simple manifold designs are non chemical reaction dependant designs, with potentially some flow interconnection as well into manifold zone (FIG. 16C). Therefore these simple manifold designs do not require an important surface to accommodate different flow misbalance and to create uniform parallel flows.

Figure 17:
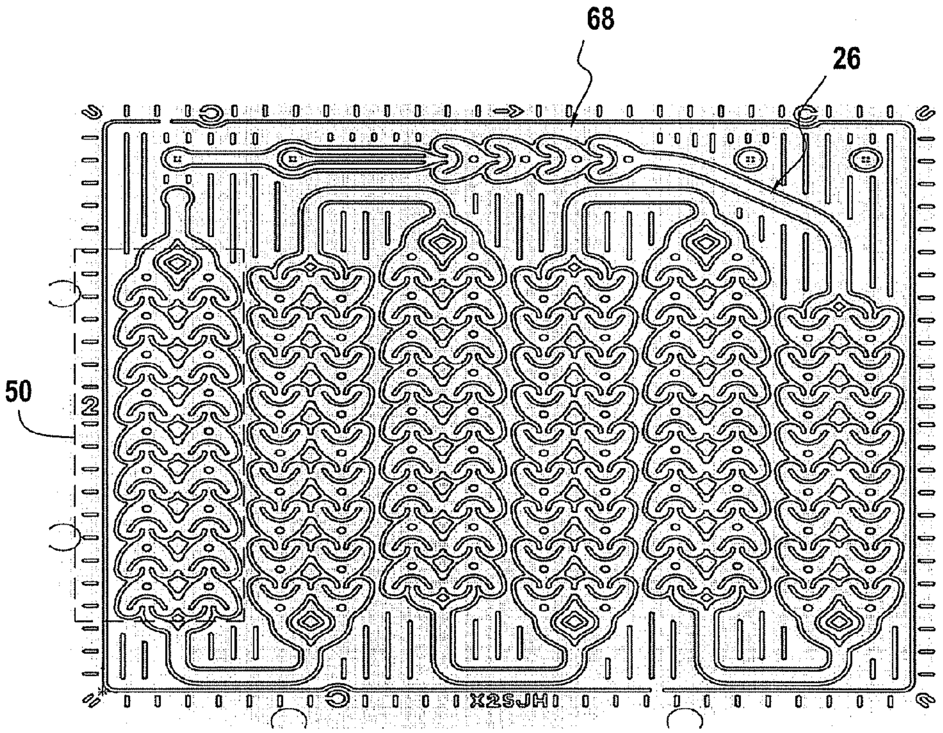
FIG. 17 and FIG. 18 are cross-sectional plan view of vertical wall structures defining alternative structures respectively to FIGS. 4 and 13.
Figure 18:
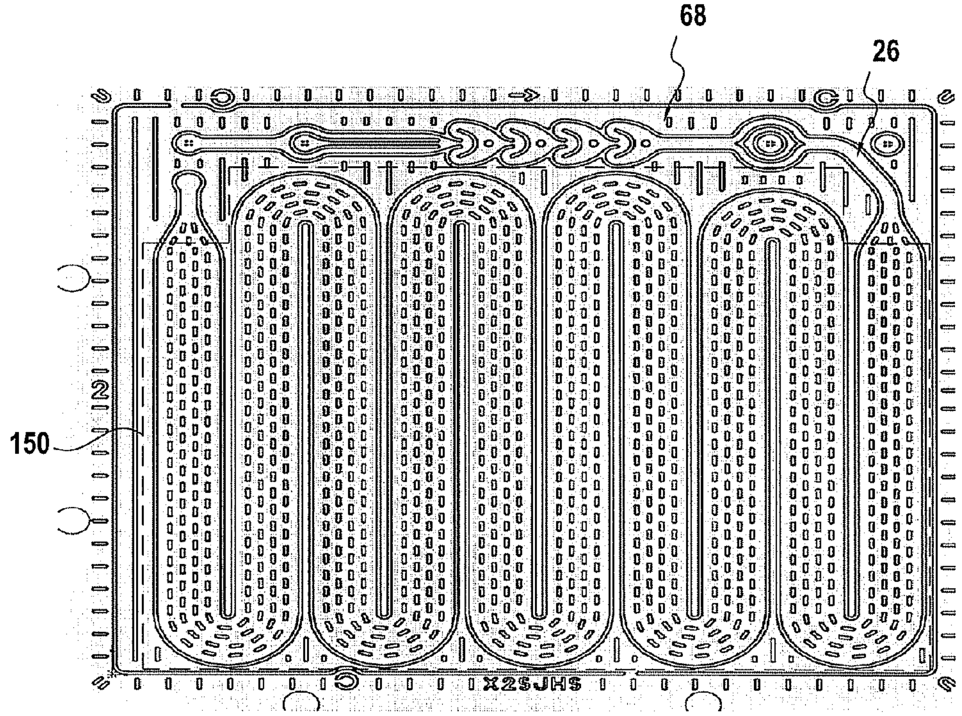

FIG. 17 (respectively FIG. 18) is similar to FIG. 4 (respectively FIG. 13) with the addition of a mixing portion 68 placed along the reactant passage 26, upstream of any multiple flow path configuration 50. This mixing portion 68 comprises a series of chamber 34.

Figure 19:
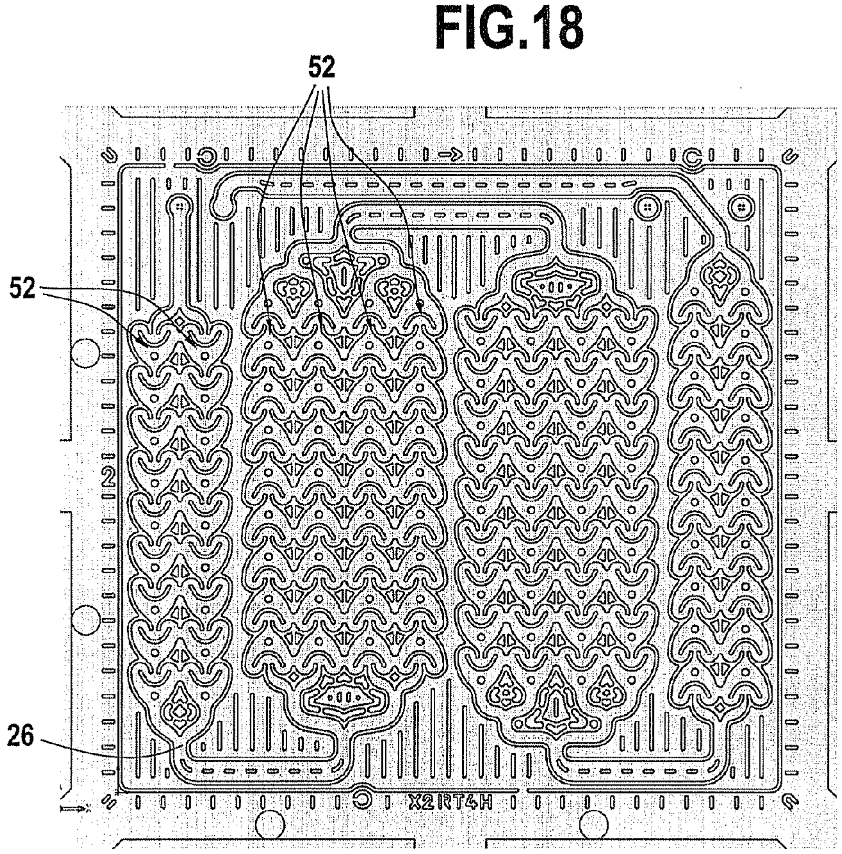
FIG. 19 is a cross-sectional plan view of vertical wall structures combining parallel multiple flow path configurations shown on FIGS. 4 and 5.

FIG. 19 shows another possible design for the reactant passage 26 in which there are several parallel multiple flow path configuration 50 placed in series which do not have the same number of parallel flow paths 52: in this example some parallel multiple flow path configurations 50 have two parallel flow paths 52 and parallel multiple flow path configurations 50 have four parallel flow paths 52.

Other design are possible according to the invention, notably having other numbers of parallel flow paths in one parallel multiple flow path configuration: for instance three, five, six, eight parallel flow paths.

Preferably, said communicating zones 54, 154 and 254 have a length ranging from 0.5 to 6 mm, preferably from 1 to 5 mm and preferably from 1.5 to 3.5 mm.

Preferably, the height of the volume 24 and of the reactant passage 26, which is also the height of the elementary design patterns 34, 134, 234 and of the communicating zones 54, 154 and 254, ranges from 0.8 mm to 3 mm.

Preferably, said communicating zones 54, 154 and 254 have a ratio height/length ranging from 0.1 to 6, and preferably from 0.2 to 2.

Preferably, the width of said elementary design patterns along the flow path is ranging from 1 to 20 mm, and preferably from 3 to 15 mm.

Preferably, the ratio between the width of said elementary design patterns along the flow path, at the location of the communicating zone 54, 154, 254, and the length of said communicating zones is ranging from 2 to 40, and preferably from 2 to 14.

According to the invention, when considering two adjacent parallel flow paths 52, 152, 252, there are at least two communicating zones 54, 154, 254 located somewhere between the inlet and the outlet of the parallel multiple flow path configuration 50, 150, 250.

Depending on elementary design patterns along the flow path, number of parallel paths, global implementation into available surface and manifold design, different numbers of communicating zones 54, 154, 254 may be needed to get fully uniform flow distribution. But most of the correction is usually done within the first two communicating zones 54, 154, 254.

The microfluidic devices according to the present invention are desirably made from one or more of glass, glass-ceramic, and ceramic. Processes for preparing such devices from glass sheets forming horizontal walls, with molded and consolidated frit positioned between the sheets forming vertical walls, are disclosed, for example, in U.S. Pat. No. 7,007,709, "Microfluidic Device and Manufacture Thereof," but fabrication is not limited to this method.

The devices of the present invention may also include layers additional to those shown, if desired.

"Reactant" as used herein is shorthand for potentially any substance desirable to use within a microfluidic device. Thus "reactant" and "reactant passage" may refer to inert materials and passages used for such.

What is claimed is:

1. A microfluidic device comprising at least one reactant passage defined by walls and comprising at least one set of parallel paths, each parallel path of said at least one set of parallel paths comprising successive chambers with fluid communication therebetween, wherein the at least one set of parallel paths comprises at least two communicating zones between respective chambers of two adjacent parallel paths of the at least one set of parallel paths, said communicating zones lying along a common plane with said chambers between which said communicating zones are placed.

2. The microfluidic device according to claim 1 wherein at least two communicating zones are formed between all pairs of adjacent parallel paths of said at least one set of parallel flow paths.

3. The microfluidic device according to claim 1 wherein said communicating zones are formed between all adjacent chambers of said successive chambers of said at least one set of parallel paths.

4. The microfluidic device according to claim 1 wherein said communicating zones have a length ranging from 1.5 to 3.5 mm.

5. The microfluidic device according to claim 1 wherein said communicating zones have a ratio height/length ranging from 0.1 to 6 mm.

6. The microfluidic device according to claim 1 wherein the ratio between the width of said chambers, at the location of the respective communicating zones, and the length of said communicating zones is from 2 to 14.

7. The microfluidic device according to claim 1 wherein said chambers include a split of the reactant passage into at least two sub-passages, and a joining of the split passages, and a change of the passage direction, of at least one of the sub-passages, of at least 90 degrees.

8. The microfluidic device according to claim 1 wherein said reactant passage contains at least two sets of parallel paths placed in series.

9. The microfluidic device according to claim 8 wherein said at least two sets of parallel paths each comprise a number of flow paths, and wherein each comprises a different number of parallel paths.

10. The microfluidic device according to claim 1 said reactant passage is located within a reaction layer and wherein said microfluidic device further comprises one or more thermal control passages positioned and arranged within two thermal layers which are sandwiching said reaction layer without any fluid communication between said thermal control passages and said reactant passage.

* * * * *